INVENTOR
WERNER E. ALTMANN

BY Dicker & Craig

ATTORNEYS

United States Patent Office 3,451,513
Patented June 24, 1969

3,451,513
BLOCKING-TYPE SYNCHRONIZING SHIFTING CLUTCH FOR MOTOR VEHICLE CHANGE-SPEED TRANSMISSIONS
Werner E. Altmann, Stuttgart, Germany, assignor to Daimler-Benz Aktiengesellschaft, Stuttgart-Unterturkheim, Germany
Filed Apr. 27, 1967, Ser. No. 634,295
Claims priority, application Germany, Apr. 30, 1966, D 50,004
Int. Cl. F16d 11/00, 13/00, 13/60
U.S. Cl. 192—53          20 Claims

ABSTRACT OF THE DISCLOSURE

A blocking-type synchronizing shifting clutch for change-speed transmissions adapted to couple gear wheels freely rotatably mounted on a shaft to such shaft, which includes synchronizing surfaces as well as coupling members securely arranged at the gear wheels, a shifting sleeve axially displaceably but non-rotatably mounted on the sleeve carrier of the shaft and provided with counter coupling members, a shifting fork for axially displacing the shifting sleeve to effect engagement of a speed, and a synchronizing ring rotatable with respect to the shifting sleeve by only a limited amount, the shifting sleeve as well as the synchronizing ring being provided with mutually cooperating blocking surfaces blocking the full engagement of the shifting sleeve with a preselected gear until synchronism exists, in which the counter coupling members are constituted at the same time by the teeth between the shifting sleeve and its carrier and these teeth of the shifting sleeve are adapted to be engaged into the teeth of the gear wheels disposed directly adjacent the same and serving as coupling members, and in which the gear wheel body is provided with synchronizing surfaces which extend at least in part over the teeth serving as coupling members.

Background of the invention

The present invention relates to a blocking-type synchronizing shifting clutch for change-speed transmissions, especially motor-vehicle change-speed transmissions for coupling the gears freely rotatable on a shaft to this shaft, whereby a synchronizing surface and a coupling member are securely arranged at the gear wheel radially inwardly of the same and whereby the shaft carries by means of a carrier in a non-rotatable but axially displaceable manner a shifting sleeve of web-like construction in cross section which is provided with the counter coupling members and is axially movable for purposes of engagement by means of a shifting fork and which cooperates by means of deflector or blocking surfaces with synchronizing rings which are rotatable with respect to the shifting sleeve by only a limited amount but are otherwise non-rotatably connected therewith and are axially displaceable with respect thereto after overcoming a spring ring.

Blocking-type synchronizing devices have become known due to the activities of Borg-Warner. However, these prior art blocking-type synchronizing mechanisms have, inter alia, the disadvantage that they occupy an excessive amount of space between the gear wheels of a change-speed transmission. For with change-speed transmissions one constantly aims at constructing the synchronizing installations as small and as narrow as possible in order that the space remaining within the transmission housing between the gear wheels can be utilized as well as possible. A blocking-type synchronizing claw clutch of the aforementioned type has become known in the German Patent 1,101,057, filed in the name of the assignee of the present application, which is constructed already smaller in the axial direction than the heretofore known Borg-Warner clutches. With this last-described known shifting clutch as disclosed in the German patent, the coupling members are located directly adjacent the synchronizing surfaces at the gear wheel body and nearly on the same diameter as the latter. The web-like shifting sleeve has in its radial center part many pin-like connecting members between an outer ring part and an inner ring part. These pin members accommodate the deflecting or blocking surfaces and form at the same time the counter coupling members for the ultimate engagement. A spring ring externally surrounds the synchronizing rings combined into a unit and fixes the same in the center position.

This known prior art shifting clutch has as such a still quite complicated construction. In particular, the assembly from the numerous individual parts and the manufacture thereof are very complicated and require a very accurate finish. Additionally, this prior art shifting clutch still is of relatively wide construction since the deflecting or blocking as well as the coupling members are disposed axially one behind the other. Furthermore, the spring ring expands with high rotational speeds as a result of the centrifugal force so that a sufficient synchronization is no longer assured.

Summary of the invention

The present invention aims at avoiding these disadvantages. The underlying problems are solved by the present invention with the aforementioned type of shifting clutches in that the toothed arrangement between the shifting sleeve and its carrier serves simultaneously as counter-clutch or counter coupling members and is adapted to be inserted into the toothed arrangement of the gear wheels disposed directly adjacent thereto and serving as clutch or coupling members and in that the synchronizing surfaces fixed at the gear wheel bodies extend at least in part over the toothed arrangements serving as clutch or coupling members.

The construction according to the present invention results in a further advantageous axial reduction of the shifting clutch. This is due to the fact that now the clutch or coupling members intended for the engagement are completely separate from the deflecting or blocking surfaces. A toothed arrangement at the shifting sleeve can be additionally dispensed with thereby. This is so as the shifting sleeve now is provided only with the deflecting or blocking surfaces. Whereas with the known prior art arrangement, the teeth are springy or elastic also in the engaging position since the deflecting or blocking surfaces are still located in front thereof and as a result thereof a lever arm is produced, this is completely avoided with the construction according to the present invention. Finally, a still further simplification is obtained from a structural point of view which has a consequence a more ready assembly and also a more simple manufacture of the individual parts.

With one construction according to the present invention a ring body is secured or fixed on an extension or offset at the gear wheel body facing the shifting sleeve, the diameter of the offset or extension being only slightly larger than the outer diameter of the teeth serving as clutch or coupling members; the outer part of the rnig body, which is extended in the direction toward the shifting sleeve, forms externally the conical synchronizing surface. The securing of this ring body on the extension or offset can take place in any suitable, known manner, for example, by shrinking.

With a preferred embodiment according to the present invention, both synchronizing rings are combined into a unit and are held in constant secure abutment at their mutually facing end surfaces by clamps uniformly distributed over the circumference whereby the conical surfaces for the synchronization are arranged radially inwardly. Thus, two identical synchronizing rings are utilized advantageously and are placed one against the other in a mirror-image-like manner by rotation of one ring through 180°. The securing by means of clamps offers the advantage that it is at all times disengageable or detachable and that it may be easily assembled. This unit constituted by the synchronizing rings is thereby provided internally with a groove for the engagement of the spring ring which is fixed in the shifting sleeve within an annular groove inside of the unit. It is thereby appropriate to provide the groove with inclined surfaces, by means of which the spring ring can be compressed inwardly during the shifting operation. If the ring is now expanded by the centrifugal force, then a reinforcement of the spring force results. This spring ring therefore assumes the blocking action as long as the synchronizing rings, for example, by reason of an oil film on the synchronizing surfaces, have not yet rotated with respect to the shifting sleeve and abut against one another with their deflecting or blocking surfaces.

According to one construction of the present invention, each synchronizing ring is provided on the side thereof facing the sleeve with several axial apertures uniformly distributed over the circumference for the engagement of radial arms at the sleeve and the surfaces of these apertures disposed in the circumferential direction are inclined or beveled off approximately along half their axial depth for the purpose of forming deflecting or blocking surfaces. The present invention thereby contemplates to provide altogether three or four apertures and correspondingly also three or four arms at the shifting sleeve.

The shifting sleeve thereby consists of a first and of a second ring part whose first part is enlarged inwardly into a hub and is provided internally with the teeth engaging into the sleeve carrier whereas its outer circumferential surface is only slightly smaller in diameter than the inner diameter of the synchronizing rings and serves for the connection with the second ring part. This connection may be left, as such, to a person skilled in the art and may be realized in any appropriate manner. However, it will be appropriate to realize the same, for example, by shrinking, welding, or also by electron beam welding. Appropriately, an annular groove for the accommodation of the spring ring is thereby arranged in the outer circumferential surface of the first ring part whose depth is slightly larger than the spring wire diameter.

With this construction, the second ring part is provided with inwardly directed extensions or projections for the engagement into and extension through the apertures in the synchronizing ring unit, whose surfaces extending in the circumferential direction are constructed in a wedge-shaped manner having mutually facing wedge tips for the purpose of forming deflecting or blocking surfaces and whose inner circumferential surfaces serve for the connection with the first ring part. The wedge tips are thereby appropriately slightly truncated by planar surfaces in the center. An annular groove for the accommodation of the spring ring is arranged in the center in the inner circumferential surfaces at the projections whose depth corresponds approximately to the radius of the spring wire.

Accordingly, it is an object of the present invention to provide a blocking-type synchronizing shifting clutch for motor vehicle change-speed transmissions which, by extremely simple means, obviates the aforementioned shortcomings and drawbacks encountered in the prior art constructions.

It is another object of the present invention to provide a synchronizing shifting clutch mechanism of the blocking type which excels by greater compactness and smaller axial length.

A further object of the present invention resides in a shifting clutch of the aforementioned type which is simple in construction, minimizes the number of individual parts, and renders their manufacture as well as assembly considerably more simple.

Still another object of the present invention resides in a blocking-type synchronizing clutch which assures sufficient synchronization regardless of the rotational speed of the device.

Still another object of the present invention resides in a synchronizing shifting clutch which minimizes the number of toothed arrangements while at the same time facilitating the manufacture and assembly of the various parts used.

A still further object of the present invention resides in a shifting clutch of the type described above which can be readily assembled and disassembled, yet is operationally reliable for purposes of synchronization under all operating conditions.

These and further objects, features, and advantages of the present invention will become more obvious from the following description when taken in connection with the accompanying drawing, which shows, for purposes of illustration only, one embodiment in accordance with the present invention, and wherein.

Figure 1:
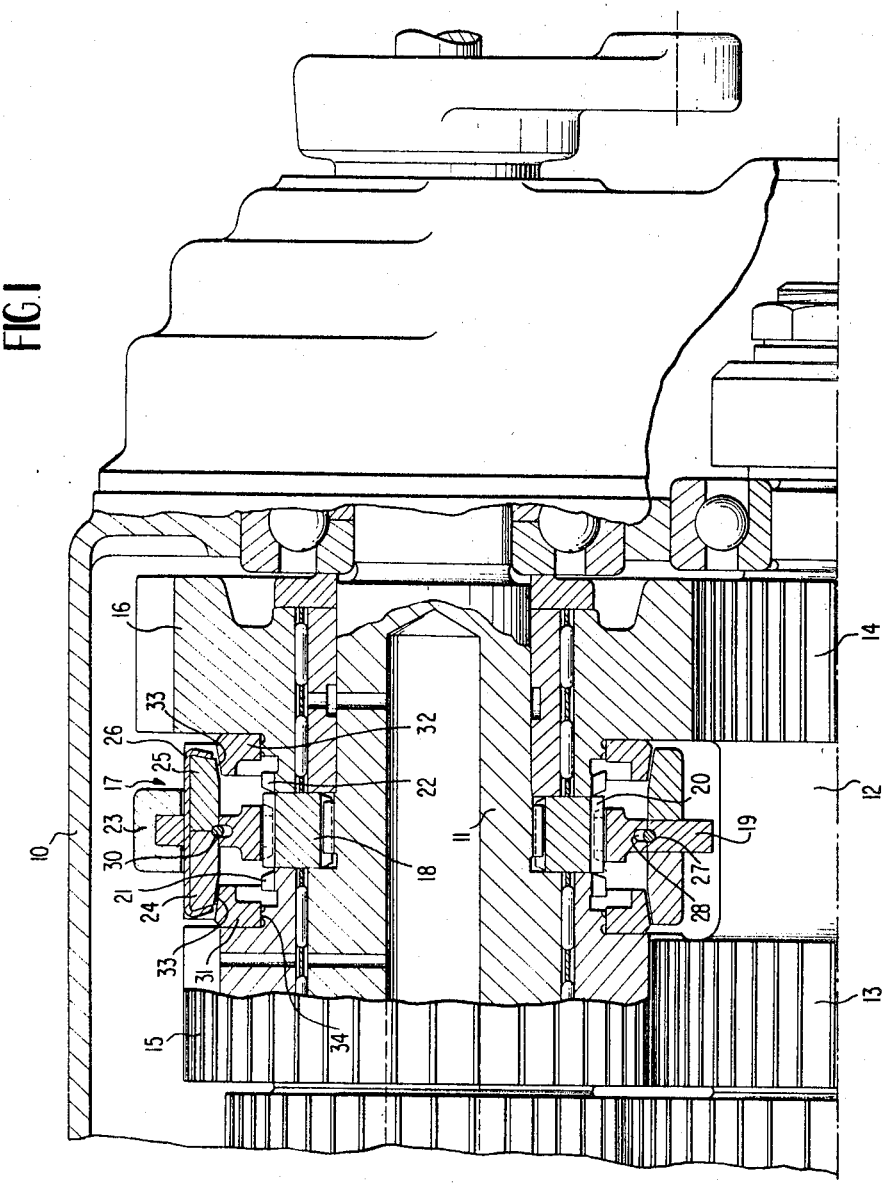
FIGURE 1 is a partial axial cross-sectional view through a shifting clutch in a motor vehicle change-speed transmission according to the present invention.

Referring now to the drawing wherein like reference numerals are used throughout the various views to designate like parts, and more particularly to FIGURE 1, reference numeral 10 designates therein a housing for a change-speed transmission of any conventional construction. A main shaft 11 and a counter shaft 12 are suitably supported within the housing 10 of the change-speed gear. The gear wheels 13 and 14 are securely mounted on the counter shaft 12, for example, cut into the same to rotate in unison therewith; the gear wheels 15 and 16 of the main shaft 11 engage with the gear wheels 13 and 14. The gear wheels 15 and 16 are freely rotatably supported in a conventional manner on the main shaft 11. A shifting clutch generally designated by reference numeral 17 is disposed between the gear wheels 15 and 16 with the aid of which they can be selectively clutched or coupled to the main shaft 11.

A shifting sleeve carrier 18 is non-rotatably and axially nondisplaceably secured to or fixed on the main shaft 11 in any conventional manner. The shifting sleeve generally designated by reference numeral 19 is arranged on the shifting sleeve carrier 18 axially displaceable, but non-rotatable with respect thereto by means of teeth 20. Directly adjacent the teeth 20 are located similar but considerably shorter teeth 21 and 22 which are secured at the gear wheel bodies 15 and 16 or are constituted by the latter. These teeth 21 and 22 form the clutch or coupling members for the final engagement of the shifting clutch. The teeth 20 at the shifting sleeve 19 serve thereby as counter-clutch or counter-coupling members. The teeth 20—as can be readily recognized from FIGURE 1—are adapted to be inserted into or engaged with the teeth 21 or 22 upon axial displacement of the shifting sleeve 19.

The shifting sleeve 19 is constructed in a web-like manner and is externally surrounded by a shifting fork 23. The shifting sleeve 19 further accommodates the synchronizing rings 24 and 25 which are combined into a unit. Clamps 26 serve for holding together these two synchronizing rings 24 and 25. A spring ring 27 is arranged in a groove 28 of the shifting sleeve 19 and engages in a groove 30 (FIGURE 1) of the unit constituted by the two synchronizing rings 24 and 25. The rings 31 and 32 are non-rotatably secured in any conventional manner at the gear wheels 15 and 16 for cooperating with the synchronizign rings 24 and 25. The rings 31 and 32 are provided externally with the synchronizing surfaces 33 and are located on an extension or offset 34 of a respective gear body whose diameter is only slightly larger than the outer diameter of the teeth 21. The rings 31 and 32 are extended in the outer part thereof in the direction toward the shifting sleeve 19 up to a point over the teeth 21.

*Operation*

The operation of the shifting clutch according to the present invention is believed obvious. For purposes of engaging a speed, the shifting sleeve 19 is, for example, displaced toward the left by means of the shifting fork 23. As a result thereof, the synchronizing surface 33 of ring 31 comes into contact with the synchronizing surface of synchronizing ring 24. The latter rotates by a slight amount with respect to the shifting sleeve 19 so that the lateral deflecting or blocking surfaces (not shown in this figure) come into abutment against one another and prevent a further left-ward movement of the shifting sleeve 19. Only when synchronism is achieved, the effect of the deflecting or blocking surfaces becomes ineffectual in a conventional manner and the shifting sleeve 19 can be engaged with its teeth 20 into the teeth 21 of the gear wheel 15.

Figure 2:
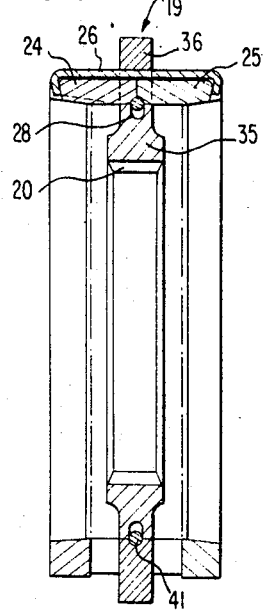
FIGURE 2 is a cross-sectional view through the shifting sleeve together with the synchronizing rings mounted thereon in accordance with the present invention.
Figure 3:
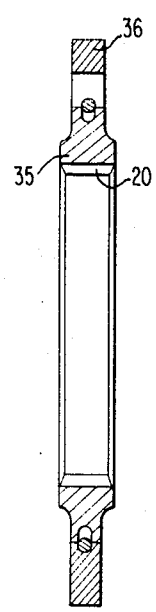
FIGURE 3 is an axial cross-sectional view through the shifting sleeve alone.
Figure 4:
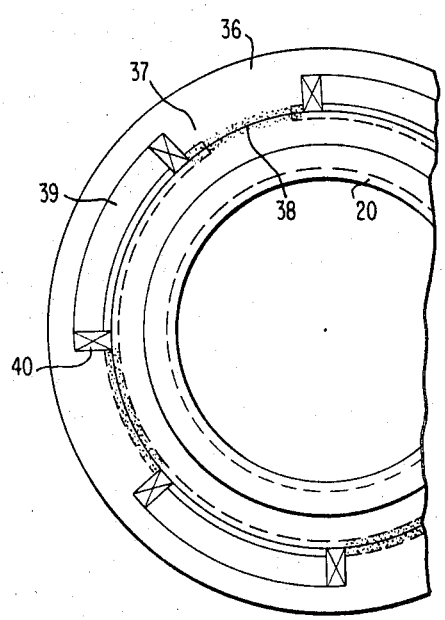
FIGURE 4 is a partial elevational view of the shifting sleeve of FIGURE 3.

According to FIGURES 2 to 4, the shifting sleeve 19 consists of a first ring part 35 and of a second ring part 36. The ring part 35 is enlarged in the direction toward the shifting sleeve carrier and is provided internally with the teeth 20. The second ring part 36 is provided with inwardly directed projections 37 (FIGURE 4). The inner circumferential surfaces 38 of these projections 37 serve for the connection and securing of the second ring part 36 at the first ring part 35. Apertures 39 are formed in effect by these projections 37—preferably four in number—through which extend the synchronizing rings 24 and 25 inclusive their spring clamps 26. The mutually facing end surfaces 40 of the projections 37 serve as deflecting or blocking surfaces and, for that purpose, are constructed in a wedge-shaped manner. This takes place in such a manner that the wedge tips mutually face each other. However, each wedge-tip is also slightly truncated so that a planar surface results in the center. Annular grooves 28 and 41 are provided in the two ring parts 35 and 36 whereby the depth of the latter, i.e., of the annular grooves 41 corresponds approximately to the radius of the spring wire. In contradistinction thereto, the annular groove 28 is so deep that the spring wire can completely disappear therein.

Figure 5:
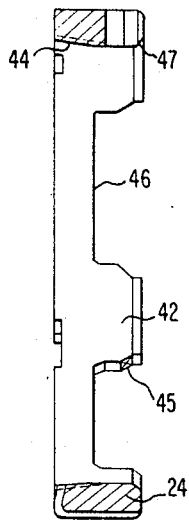
FIGURE 5 is an axial cross-sectional view through a synchronizing ring in accordance with the present invention.
Figure 6:
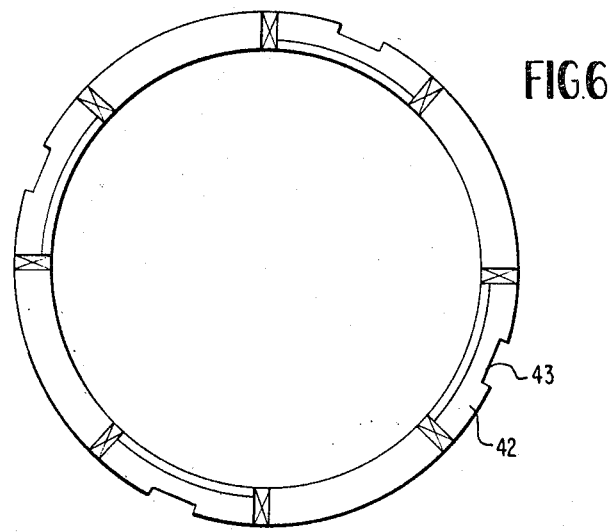
FIGURE 6 is an elevational view on the synchronizing ring of FIGURE 5.

According to FIGURES 5 and 6, the synchronizing ring 24—and of course correspondingly also, the synchronizing ring 25 not illustrated in these figures—is provided with projections 42 which are directed toward the shifting sleeve 19 and whose number corresponds to the numbeer of the apertures 39 in the shifting sleeve 19. Grooves 43 are accommodated externally in these projections 42 in which are arranged the clamps 26. The synchronizing ring 24 is provided internally with a conical surface 44 which cooperates with the synchronizing surface 33 at the ring 31. The projections 42—by means of which the synchronizing ring unit extends through the apertures 39 of the shifting sleeve 19—are provided at the mutually facing end surfaces pointing in the circumferential direction with deflecting or blocking surfaces 45. The inclination and size of these deflecting or blocking surfaces 45 corresponds to those of the deflecting or blocking surfaces 40 at the sleeve 19.

The apertures 46 between the projections 42, however, are deepend beyond the deflecting or blocking surfaces 45 to such an extent that during the final clutch engagement the projections 37 at the shifting sleeve 19 have sufficient space within these apertures 46. The synchronizing ring 24 is provided on the inside of the projections 42 with beveled surfaces 47 which—upon mirror-image-like assembly of two synchronizing rings into a unit—form a wedge-shaped groove for the accommodation of the spring ring 27. During the sliding movement into the final clutch engagement, the spring ring 27 is thus compressed inwardly by means of these inclined surfaces 47. As a result thereof, the shifting sleeve 19 can continue in a conventional manner in its movement toward the respective side.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A blocking-type synchronizing shifting clutch for change-speed transmissions, especially motor vehicle change-speed transmissions, comprising a shaft, gear means freely rotatably mounted on said shaft and each having gear body means, and shifting clutch means for coupling said gear means to said shaft including synchronizing surface means and coupling means at said gear body means, shifting sleeve means, carrier means non-rotatably mounted on said shaft, toothed means mounting said shifting sleeve means on said carrier means non-rotatably but axially displaceably with respect thereto, said shifting sleeve means being also provided with counter-coupling means, shifting fork means for axially displacing the shifting sleeve means to effect engagement, synchronizing ring means having blocking surface means and being rotatably relative to said shifting sleeve means by only a limited amount, said shifting sleeve means being provided with blocking surface means complementary to and cooperating with the blocking surface means at the synchronizing ring means, said synchronizing ring means being axially displaceable relative to said shifting sleeve means after overcoming a spring force, the toothed means between the shifting sleeve means and the carrier means serving simultaneously as counter-coupling means and being adapted to engage into teeth of the gear wheel means located directly adjacent thereto and serving as said coupling means, and the synchronizing surface means at the gear body means extending at least partly over the teeth serving as coupling means; each synchronizing ring means being provided on the side facing the sleeve means with axial aperture means distributed uniformly over the circumference for the engagement of radial arms provided at the sleeve means, the surfaces of said aperture means disposed in the circumferential direction being beveled off approximately along half their axial depth for the formation of blocking surface means; the shifting sleeve means consisting of a first and of a second ring part, said first ring part being enlarged inwardly into a hub portion and being provided internally with the toothed means engaging in the sleeve carrier means, the outer circumferential surfaces of said first ring part being only slightly smaller in diameter than the inner diameter of the synchronizing ring means and serving for the connection with the second ring part; an annular groove for the accommodation of the spring ring means is provided in the external circumferential surface of the first ring part, the depth of said annular groove being slightly larger than that of the spring wire diameter.

2. A shifting clutch according to claim 1, wherein the second ring part is provided with inwardly projecting extensions for the engagement into the aperture means of the synchronizing ring unit, the circumferentially directed surfaces of said projections being of wedge shaped construction with mutually facing wedge tips for the formation of blocking surface means, and the inner circumferential surfaces thereof serving for the connection with the first ring part.

3. A shifting clutch according to claim 1, wherein the gear body means is provided with an offset facing the shifting sleeve means whose diameter is only slightly larger than the outer diameter of the teeth serving as coupling means, ring body means secured on said offset whose external portion extended in the direction of the shifting sleeve means forms externally the conical synchronizing surface means; two synchronizing ring means are combined into a unit, and clamp means uniformly distributed over the circumference thereof for holding the two synchronizing ring means in constant rigid abutment at their mutually facing end faces, and conical surface means for the synchronization being arranged radially inwardly of the synchronizing ring means; the unit constituted by the synchronizing ring means is provided inwardly with a groove for the engagement of a spring ring means which is secured in the shifting sleeve means within an annular groove means inside of said unit.

4. A shifting clutch according to claim 3, wherein the second ring part is provided with inwardly projecting extensions for the engagement into the aperture means of the synchronizing ring unit, the circumferentially directed surfaces of said projections being of wedge shaped construction with mutually facing wedge tips for the formation of blocking surface means, and the inner circumferential surfaces thereof serving for the connection with the first ring part.

5. A shifting clutch according to claim 4, wherein an annular groove for the accommodation of the spring ring means is provided in the center of the internal circumferential surfaces of the projections, the depth of said annular groove corresponding approximately to the radius of the spring ring wire.

6. A blocking-type synchronizing shifting clutch for change-speed transmissions, especially motor vehicle change-speed transmissions, comprising a shaft, gear means freely rotatably mounted on said shaft and each having gear body means, and shifting clutch means for coupling said gear means to said shaft including synchronizing surface means and coupling means at said gear body means, shifting sleeve means, carrier means non-rotatably mounted on said shaft, toothed means mounting said shifting sleeve means on said carrier means nonrotatably but axially displaceably with respect thereto, said shifting sleeve means being also provided with counter-coupling means, shifting fork means for axially displacing the shifting sleeve means to effect engagement, synchronizing ring means having blocking surface means and being rotatable relative to said shifting sleeve means by only a limited amount, said shifting sleeve means being provided with blocking surface means complementary to and cooperating with the blocking surface means at the synchronizing ring means, said synchronizing ring means being axially displaceable relative to said shifting sleeve means after overcoming a spring force, the toothed means between the shifting sleeve means and the carrier means serving simultaneously as counter coupling means and being adapted to engage into teeth of the gear wheel means located directly adjacent thereto and serving as said coupling means, and the synchronizing surface means at the gear body means extending at least partly over the teeth serving as coupling means; spring ring means for producing said spring force; the shifting sleeve means consisting of a first and of a second ring part, said first ring part being enlarged inwardly into a hub portion and being provided internally with the toothed means engaging in the sleeve carrier means, the outer circumferential surfaces of said first ring part being only slightly smaller in diameter than the inner diameter of the synchronizing ring means and serving for the connection with the second ring part; an annular groove for the accommodation of the spring ring means is provided in the external circumferential surface of the first ring part, the depth of said annular groove being slightly larger than that of the spring wire diameter.

7. A blocking-type synchronizing shifting clutch for change-speed transmissions, especially motor vehicle change-speed transmissions, comprising a shaft, gear means freely rotatably mounted on said shaft and each having gear body means and shifting clutch means for coupling said gear means to said shaft including synchronizing surface means and coupling means at said gear body means, shifting sleeve means, carrier means non-rotatably mounted on said shaft, toothed means mounting said shifting sleeve means on said carrier means non-rotatably but axially displaceably with respect thereto, said shifting sleeve means being also provided with counter-coupling means, shifting fork means for axially displacing the shifting sleeve means to effect engagement, synchronizing ring means having blocking surface means and being rotatable relative to said shifting sleeve means by only a limited amount, said shifting sleeve means being provided with blocking surface means complementary to and cooperating with the blocking surface means at the synchronizing ring means, said synchronizing ring means being axially displaceable relative to said shifting sleeve means after overcoming a spring force, the toothed means between the shifting sleeve means and the carrier means serving simultaneously as counter coupling means and being adapted to engage into teeth of the gear wheel means located directly adjacent thereto and serving as said coupling means, and the synchronizing surface means at the gear body means extending at least partly over the teeth serving a coupling means; spring ring means for producing said spring force; the shifting sleeve means consisting of a first and of a second ring part, said first ring part being enlarged inwardly into a hub portion and being provided internally with the toothed means engaging in the sleeve carrier means, the outer circumferential surfaces of said first ring part being only slightly smaller in diameter than the inner diameter of the synchronizing ring means and serving for the connection with the second ring part; two synchronizing ring means being combined into a unit, and clamp means uniformly distributed over the circumference thereof for holding the two synchronizing ring means in constant rigid abutment at there mutually facing end faces, and conical surface means for the synchronization being arranged radially inwardly of the synchronizing ring means.

8. A shifting clutch according to claim 7, wherein the second ring part is provided with inwardly projecting extensions for the engagement into the aperture means of the synchronizing ring unit, the circumferentially directed surfaces of said projections being of wedge shaped construction with mutually facing wedge tips for the formation of blocking surface means, and the inner circumferential surfaces thereof serving for the connection with the first ring part.

9. A shifting clutch according to claim 8, wherein an annular groove for the accommodation of the spring ring means is provided in the center of the internal circumferential surfaces of the projections, the depth of said annular groove cooresponding approximately to the radius of the spring ring wire.

10. A synchronizing clutch for selectively coupling, to a shaft, two gears rotatably mounted on the shaft, wherein the gears each have synchronizing friction sufaces and coupling toothed surfaces for cooperation with the clutch, comprising: a shifting sleeve provided with a plurality of inwardly directed teeth means forming a non-rotatable and axially displaceable coupling with the shaft, and upon axial displacement, said teeth means engaging the toothed surfaces of a respective one of the gears to drivingly interconnect the shaft and respective gear, said shifting sleeve having a plurality of circumferentially spaced axially through passages and a plurality of cam blocking surfaces partially forming the walls of said passages; two synchronizing rings abutting at their axially inner ends and provided with synchronizing friction surfaces at their axially outer ends for respectively engaging the synchronizing friction surfaces of the gears, each of said synchronizing rings having axially projecting portions extending into respective passages and provided with surfaces abutting at the axially inner ends; a plurality of clamping means extending through corresponding ones of said passages and each engaging said synchronizing rings for tightly holding said abutting surfaces in engagement; said synchronizing rings being mounted for limited axial movement with respect to said shifting sleeve and each being provided with cam surface means for blocking the limited axial movement in response to axial pressure of said shifting sleeve and synchronizing friction pressure produced by engagement of said synchronizing friction surfaces for relative movement between said shaft and the gears only above a predetermined speed.

11. The clutch according to claim 10, said clamp means being a plurality of U-shaped sheet metal springs as seen in axial cross section.

12. The clutch according to claim 10, wherein said shifting sleeve is provided with radially biased cam means; each of said synchronizing ring projecting portions having an inwardly facing bevel surface for cooperating with the adjacent ring bevel surface to form a radially inwardly directed groove receiving therein said radially biased cam means of said shifting sleeve.

13. The clutch according to claim 12, wherein said radially biased cam means is a spring ring received within a correspondingly shaped groove in said shifting sleeve opening into said axially through passages.

14. The clutch according to claim 13, wherein said shifting sleeve consists of two separate parts rigidly joined together along surfaces intersecting said axially through passages and said spring ring groove.

15. The clutch according to claim 14, wherein one of said shifting sleeve separate parts widens in axial cross section towards its radial inside portion to form a hub provided with said teeth means, the outermost circumferential surface of said one part having a slightly smaller diameter than the innermost diameter of said synchronizing rings and constituting one half of said surfaces rigidly joined together.

16. The clutch according to claim 15, wherein said one part has an annular groove in its outermost circumferential surface opening radially outwardly and constituting said correspondingly shaped groove and being of a depth greater than the radial width of said spring ring.

17. The clutch according to claim 16, wherein the other of said shifting sleeve parts is provided with radially inwardly extending projections between the passages and between said synchronizing ring axially projecting portions; said other part projections having said cam blocking surfaces; the innermost surfaces of said other part projections constituting the other half of said surfaces rigidly joined together.

18. The clutch according to claim 17, wherein said other part projections have annular groove portions radially opening into the axial center of their innermost surfaces receiving therein said spring ring and being of a radial depth substantially equal to one half the radial depth of said spring ring.

19. The clutch according to claim 10, wherein said gear synchronizing friction surfaces extend axially toward said clutch in overlapping relationship with said coupling toothed surfaces.

20. The clutch according to claim 10, wherein said synchronizing ring synchronizing friction surfaces are radially inwardly directed and said gear synchronizing friction surfaces are radially outwardly directed; each of said gears includes a separate ring portion having the respective synchronizing friction surface and an innermost diameter larger than the outermost diameter of the respective coupling toothed surfaces.

References Cited

UNITED STATES PATENTS

| | | | |
|---|---|---|---|
| 2,221,896 | 11/1940 | Haigh | 192—53 |
| 2,256,308 | 9/1941 | Bixby et al. | 192—53 |
| 2,319,740 | 5/1943 | Lapsley et al. | 192—107 |
| 2,369,842 | 2/1945 | Neracher et al. | 192—53 |
| 2,425,203 | 8/1947 | Peterson et al. | 192—53 |
| 2,470,208 | 5/1949 | Avila | 192—53 |
| 2,555,961 | 6/1951 | Dunn | 192—53 |
| 3,365,039 | 1/1968 | Stott et al. | 192—53 |

BENJAMIN W. WYCHE III, *Primary Examiner.*

L. J. PAYNE, *Assistant Examiner.*

U.S. Cl. X.R.

192—107